May 24, 1966  S. VOLLPRECHT  3,252,500
SAFETY VALVE FOR GAS BURNERS
Filed Oct. 14, 1963
FIG.1
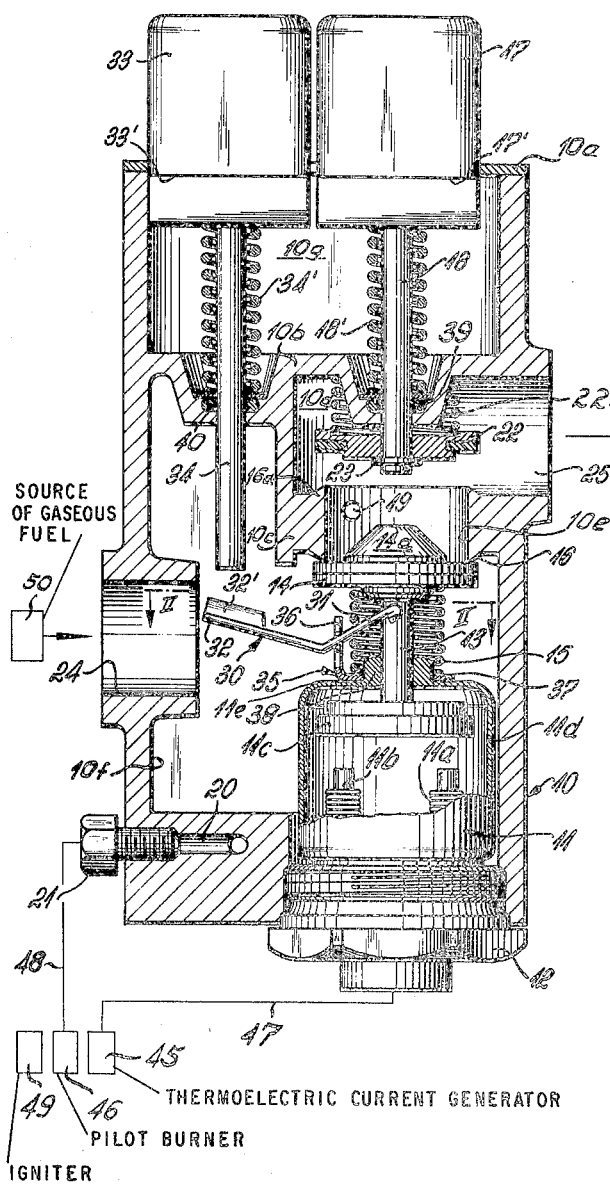
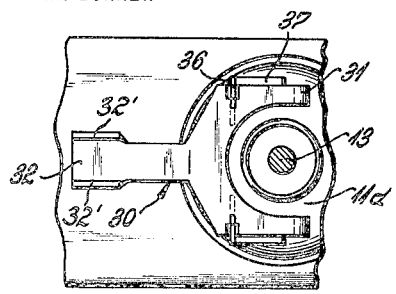
FIG.2
INVENTOR:
SIEGFRIED VOLLPRECHT
by.
Michael S. Striker
his ATTORNEY

United States Patent Office

3,252,500
Patented May 24, 1966

3,252,500
SAFETY VALVE FOR GAS BURNERS
Siegfried Vollprecht, Wernau (Neckar), Germany, assignor to Junkers & Co. G.m.b.H., Wernau (Neckar), Germany
Filed Oct. 14, 1963, Ser. No. 315,799
Claims priority, application Germany, Oct. 13, 1962, J 22,497
4 Claims. (Cl. 158—131)

The present invention relates to safety valves for gas burners, and more particularly to improvements in safety valves which serve to automatically interrupt the flow of gaseous fuel to one or more burners in response to extinguishment of flames. Still more particularly, the invention relates to an improved thermoelectrically controlled safety valve which interrupts the flow of gaseous fuel to one or more main burners of a gas range, gas boiler or another gas-heated apparatus in response to accidental or intentional extinguishment of the pilot flame.

It is an important object of my invention to provide a safety valve of the above outlined characteristics with an interrupter device which is capable of terminating or interrupting the flow of gaseous fuel to a plurality of outlets so that any likelihood of uncontrolled escape of fuel is avoided in response to a single manipulation by the hand of an operator.

Another object of the invention is to provide an interrupter device which occupies little space and which can be accommodated in the casing of the safety valve.

A further object of the invention is to provide an interrupter device which need not comprise a separate valve and which is constructed and assembled in such a way that it may change the position of the valve member in the thermoelectrically controlled safety valve.

An additional object of the invention is to provide an improved safety valve which embodies an interrupter device of the above outlined characteristics and whose thermoelectrically energizable electromagnet may serve as a support for certain component parts of the interrupter device.

Still another object of my invention is to provide a safety valve which may be used in all or nearly all types of gas burning apparatus wherein the flow of fuel to the burners is terminated in response to extinguishment of the pilot flame.

A concomitant object of the invention is to provide a safety valve wherein the position of a thermoelectrically controlled valve member may be changed with the help of a simple mechanical interrupter device and wherein the actuating means for the safety valve proper and the manipulating means of the interrupter device may be arranged next to each other to save space and to facilitate the work of an operator who is in charge of the apparatus which embodies the safety valve.

An additional object of my invention is to provide an interrupter device which consists of a small number of simple parts, which is capable of automatically assuming a position in which it is ready to interrupt the flow of gaseous fuel to a plurality of outlets in the casing of the safety valve, and which does not necessitate substantial modifications in the construction and/or operation of thermoelectrically controlled safety valves.

With the above objects in view, one feature of my invention resides in the provision of a safety valve for gas burning apparatus which comprises a casing having a gas-admitting inlet, one or more outlets, and a seat provided between the inlet and the outlet or outlets, a valve member mounted in the casing and arranged to move into and out of sealing engagement with the seat to respectively terminate and permit the flow of a gaseous fuel from the inlet to the outlet or outlets, electromagnet means comprising an armature operatively connected with and arranged to maintain the valve member out of sealing engagement with the seat whenever a suitable thermoelectric current generating device which is connected with and which may energize the electromagnet means is heated by the flame or flames of one or more burners which receive gaseous fuel from the outlet or outlets of the casing, manually operated actuating means mounted in the casing and arranged to move the valve member out of sealing engagement with the seat when the electromagnet means is de-energized, and manually operated interrupter means mounted in the casing and arranged to move the valve member into sealing engagement with the seat against the action of the armature when the electromagnet means is energized.

In accordance with a preferred embodiment of my invention, the actuating means comprises a reciprocable stem which may be moved into and out of engagement with the valve member, and the interrupter means also comprises a reciprocable stem or rod which is closely adjacent to and which is parallel with the stem of the actuating means. This rod may pivot an interrupter lever mounted in the casing and having a portion adapted to engage the valve member or an element which is connected with the valve member so as to move the latter against the action of the armature when the electromagnet means is energized. Such construction of the interrupter means renders it possible to accommodate all of its component parts in a comparatively small casing of the safety valve and to provide a pair of closely adjacent pushbuttons or similar manual controls which are located at the same side of the casing. One of the pushbuttons constitutes an element of the actuating means which serves to move the valve member away from its seat, and the other pushbutton constitutes an element of the interrupter means and serves to pivot the interrupter lever in a sense to return the valve member into sealing engagement with the seat.

The novel features which are considered as characteristic of the invention are set forth in particular in the appended claims. The improved safety valve itself, however, both as to its construction and the mode of assembling and operating the same, together with additional features and advantages thereof, will be best understood upon perusal of the following detailed description of a specific embodiment with reference to the accompanying drawing, in which:

FIG. 1 is a central vertical section through a safety valve which embodies the interrupter means of my invention; and FIG. 2 is a top plan view of the interrupter lever as seen in the direction of arrows from the line II—II of FIG. 1.

Referring to the drawings, and first to FIG. 1, there is shown a safety valve which comprises a casing 10 whose internal space is subdivided into a series of separate chambers and compartments and which accommodates the cartridge-like housing 11d of a removable electromagnet 11 of the type disclosed in a copending application of Josef Schmid and Andreas Pritzkow which is entitled, "Electromagnet for Safety Valves and the Like," and which is assigned to the same assignee. The housing 11d has an end wall 11e. The housing 11d accommodates a U-shaped core having two upwardly extending legs 11b for a winding 11a which is electrically connected to a thermoelectric current generator 45. This generator 45 is adjacent to the flame of a pilot burner 46 so that it sends a current whenever the pilot flame is ignited by an igniter 49 whereby the electromagnet 11 is energized and the core attracts a reciprocable armature 11c mounted in the housing 11d and provided at the lower end of a connecting rod 13 whose upper end is connected with a reciprocable valve member 14. The manner in which the parts 45, 46, 49 may be mounted on a common support is disclosed in a copending application of Engelbert Cramer entitled, "Attachment for Gas Burning Apparatus," and assigned to the same assignee. When the electromagnet 11 is not energized, the valve member 14 is biased against its annular seat 16 by a resilient element here shown as a helical spring 15 which is inserted between the upper end wall of the housing 11d and the underside of the valve member 14. The housing 11d is connected with a threaded plug 12 which is screwed into the bottom wall of the casing 10 and which is coaxial with the connecting rod 13. A conductor 47 which connects the winding 11a with the thermoelectric current generator 45 extends through the plug 12.

The top wall 10a of the casing 10 is provided with an aperture for a reciprocable actuating device including a pushbutton 17 which may be depressed by hand so that the lower end of its stem 18 engages the conical tip 14a of the valve member 14 and moves it against the bias of the spring 15 whereby the valve member 14 moves away from its seat 16 and permits a gaseous fuel to flow into a bore 19 leading to a port or outlet 20 which communicates with a nipple 21. This nipple is connected with a conduit 48 which conveys fuel to the pilot burner 46 so that the igniter 49 which is associated with the pilot burner 46 ignites the fuel and the thus produced flame heats the thermoelectric current generator 45 which sends a current through the conductor 47 and to the winding 11a. The legs 11b of the core then attract the armature 11c against the bias of the spring 15 so that the valve member 14 remains in open position even if the pushbutton 17 is subsequently released.

The casing 10 comprises an internal wall portion or partition 10b which is spaced from the top wall 10a and which serves as a bearing for the stem 18 and which is integral with a second wall portion or partition 10c so that the partitions 10b, 10c together define a chamber 10d which communicates with an outlet 25 and with a passage 10e which latter is controlled by valve member 14. The passage 10e is provided in the partition 10c and is coaxial with the rod 13 which in turn is coaxial with the stem 18. The intake end of the bore 19 communicates with the passage 10e, and the seat 16 is provided at the underside of the partition 10c. The casing 10 also defines a second chamber 10f which communicates with a gas-admitting inlet 24 and with the passage 10e provided, of course, that the valve member 14 is moved to its open or partly open position. The chamber 10f accommodates the electromagnet 11.

The upper side of the partition 10c defines a second annular seat 16a for a second valve member 22 which is axially movable mounted on the stem 18 and which is biased by a resilient element here shown as a helical spring 22a operating between the underside of the partition 10b and the upper side of the valve member 22. An annular stop 23 at the lower end of the stem 18 serves to arrest the valve member 22 in a lower end position. The pushbutton 17 is provided with a laterally extending flange 17' defining a shoulder which abuts against the underside of the top wall 10a when the pushbutton assumes its upper end position under the bias of a resilient element here shown as a spring 18' which is accommodated in a compartment 10g between the top wall 10a and the partition 10b.

When the operator depresses the pushbutton 17, the valve member 22 moves with the stem 18 because it is under the bias of the spring 22a so that it abuts against the stop 23. When the valve member 22 comes into abutment with the upper seat 16a to seal the passage 10e from the chamber 10d and outlet 25, the stem 18 continues to move downwardly so that its lower end engages the tip 14a and moves the valve member 14 away from the seat 16. Thus, the stream of gaseous fuel which flows from a suitable source 50 and through the inlet 24 is free to flow through the chamber 10f and into the passage 10e to enter the bore 19 and to flow into the outlet 20 and through the nipple 21 and conduit 48 to the pilot burner 46. In other words, manual depression of the pushbutton 17 brings about automatic sealing of the outlet 25 from the inlet 24 (because the valve member 22 abuts against the seat 16a) and automatic opening of a path for the flow of gaseous fuel from the inlet 24 to the outlet 20 and to the pilot burner 46. This pilot burner 46 then causes the thermoelectric current generator 45 to send a current through the conductor 47 and to the winding 11a so that the electromagnet 11 is energized and retains the armature 11c in abutment with the legs 11b of the core. Such attraction between the legs 11b and armature 11c is stronger than the bias of the spring 15 whereby the valve member 14 remains spaced from the seat 16 as long as the pilot flame of the burner 46 remains ignited. When the operator thereupon releases the pushbutton 17, the spring 18' returns the flange 17' into abutment with the underside of the top wall 10a and the stop 23 entrains the valve member 22 to the position of FIG. 1 whereby the main stream of gaseous fuel is free to flow through the passage 10e and outlet 25 into a conduit leading to one or more main burners 51 of a gas range, a gas-heated boiler or another apparatus in which the safety valve is put to use. Thus, and once the pilot flame is burning, the stream of fuel entering through the inlet 24 is free to flow continuously not only to the pilot burner 46 via outlet 20 but also to the main burner or burners 51 because the electromagnet 11 remains in energized condition.

In accordance with my invention, the casing 10 serves to accommodate an interrupter device which may interrupt the flow of gaseous fuel to the main burner or burners 51 and to the pilot burner 46 at the will of the operator. This interrupter device comprises an interrupter member here shown as a two-armed bell crank lever 30 which is accommodated in the chamber 10f and one arm 31 of which is bifurcated to form two spaced prongs which straddle the rod 13 and which extend into the space between the upper end wall of the housing 11d and the underside of the valve member 14. The other arm 32 of the lever 30 extends into the path of a reciprocable motion transmitting rod 34 whose upper end is rigid with a pushbutton 33. The pushbutton 33 is immediately adjacent to the pushbutton 17 and is also provided with a flange 33' which normally bears against the underside of the top wall 10a under the bias of a resilient element here shown as a helical spring 34' which operates between the partition 10b and the underside of the pushbutton 33. The arm 32 is provided with a pair of stiffening lugs 32' which serve to guide the lever 30 when the pushbutton 33 is depressed by a finger in order to terminate the flow of gaseous fuel to the passage 10e and hence to the outlets 20, 25.

The lever 30 is pivotably mounted in a specially configurated bearing element 35 (see particularly FIG. 2), which may be substantially L-shaped, which is provided with an upstanding bearing portion or bracket 36 provided with horizontal pivots for an intermediate portion of the lever 30 adjacent to the apex thereof. The bearing element 35 further comprises an annular carrier portion 37 which surrounds and is rotatable with respect to a concentric hub 38 provided on the upper end wall of the housing 11d. The prongs of the right-hand arm 31 of the lever 30 need not extend between the convolutions of the spring 15 and the length of these prongs is preferably selected in such a way that when the lever 30 interrupts the flow of gaseous fuel, their tips extend into a plane which is perpendicular to the plane of FIG. 1 and which passes through the common axis of the rod 13 and stem 18. The feature that the annular carrier portion 37 is rotatable about the hub 38 is of importance when the electromagnet 11 is inserted into or withdrawn from the chamber 10f because such insertion or withdrawal necessitates rotation of the housing 11d with respect to the bearing element 35.

The casing 10 preferably assumes the form of a parallelepiped block whose width is sufficient to accommodate the housing 11d and the pushbuttons 17, 33. These pushbuttons are preferably closely adjacent to each other and the motion transmitting rod 34 is parallel with the stem 18. As shown, the partition 10b serves as a bearing for the rod 34 and is provided with sealing gaskets 39, 40 which present penetration of gaseous fuel into the compartment 10g.

When the pushbutton 33 is released and when the electromagnet 11 is energized, the valve member 14 is spaced from the seat 16 and its underside maintains the interrupter lever 30 in one end position while the legs 11b of the core attract the armature 11c. Whenever the operator desires to interrupt the flow of fuel to the passage 10e (i.e., to the main burner or burners 51 and to the pilot burner 46), the pushbutton 33 is depressed by hand whereby the lower end of the rod 34 rocks the lever 30 and the prongs of the arm 31 move the valve member 14 upwardly and toward the seat 16. The armature 11c moves away from the legs 11b and the arrangement may be such that the bias of the spring 15 suffices to move the valve member 14 into actual abutment with the seat 16 as soon as the armature 11c is located substantially midway between the legs 11b and the hub 38. The spring 15 simultaneously serves to bias the carrier portion 37 against the upper end wall of the housing 11d so that the safety valve of my invention need not be provided with special retaining means for holding the bearing element 35 in requisite position. The bias of the spring 15 against the upper side of the carrier portion 37 is too weak to hinder an operator in unscrewing the plug 12 from the bottom wall of the casing 10.

When the operator releases the pushbutton 33, the valve member 14 remains in closing position because the flame of the pilot burner 46 is extinguished as soon as the outlet 20 is sealed from the inlet 24. Thus, in order to reignite the pilot burner 46 and to admit gaseous fuel to the main burner or burners 51, the operator must thereupon depress the pushbutton 17 so that the stem 18 moves the valve member 14 away from the seat 16 and permits a stream of fuel to flow into the bore 19. Once the pilot burner 46 is ignited by the device 49, its flame or flames heat the thermoelectric current generator 45 which energizes the electromagnet 11 in a manner as described hereinabove so that the main burner or burners 51 will receive fuel as soon as the operator releases the pushbutton 17. The valve member 14 then remains in open position because the electromagnet 11 is energized as long as the pilot flame is burning.

The arms 31, 32 of the lever 30 preferably make an obtuse angle with each other and may but need not be of equal length. The bracket 36 of the bearing element 35 preferably serves as an abutment for the lever 30 when the latter assumes one of its end positions in response to depression of the pushbutton 33.

The safety valve of my invention may be used in all or nearly all types of gas burning apparatus wherein the flow of fuel to one or more burners is controlled by a thermoelectric current generator. For example, and when the valve is used in a gas range, the housewife will depress the pushbutton 33 prior to leaving the home for vacation to make sure that accidental extinguishment of pilot flames will not result in uncontrolled escape of gaseous fuel. The pushbuttons 17, 33 may be located at the front side of the range.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A safety valve for gas burning apparatus, comprising a casing having gas-admitting inlet means, outlet means, and a seat provided between said inlet means and said outlet means; a valve member arranged to reciprocate into and out of sealing engagement with said seat to respectively terminate and permit the flow of a gaseous fuel from said inlet means to said outlet means; electromagnet means arranged to normally maintain said valve member out of sealing engagement with said seat, said electromagnet means comprising a housing mounted in said casing and having an end wall adjacent to said valve member, a core provided in said housing, a winding surrounding said core, an armature provided in said housing and reciprocable toward and away from said end wall in operative relationship with movements of said valve member, and a rod extending through said end wall and connecting said armature with said valve member, said armature being attracted by said core when a current flows through said winding to energize said electromagnet means whereby said valve member is moved away from said seat; manually operated actuating means comprising a stem arranged to move said valve member away from said seat when said electromagnet means is denergized; and manually operated interrupter means comprising bearing means including a substantially L-shaped body having a first leg which constitutes a carrier portion outwardly adjacent and supported by said end wall, and a second leg which constitutes a bearing portion rigid with said carrier portion, an interrupter lever pivotably mounted on said bearing portion, said lever having a first arm extending between said valve member and said carrier portion and a second arm, and a motion transmitting rod reciprocably mounted in said casing in parallelism with said stem and arranged to be moved by hand to engage said second arm whereby said lever pivots with respect to said bearing portion and its first arm moves the valve member into sealing engagement with said seat against the action of said armature when said electromagnet means is energized.

2. A safety valve for gas burning apparatus, comprising a casing having gas-admitting inlet means, outlet means, and a seat provided between said inlet means and said outlet means; a valve member arranged to reciprocate into and out of sealing engagement with said seat to respectively terminate and permit the flow of a gaseous fuel from said inlet means to said outlet means; electromagnet means arranged to normally maintain said valve member out of sealing engagement with said seat, said electromagnet means comprising a housing mounted in said casing and having an end wall adjacent to said valve member, a core provided in said housing, a winding surrounding said core, an armature provided in said housing and reciprocable toward and away from said end wall in operative relationship with movements of said valve member, and a rod extending through said end wall and connecting said armature with said valve member, said armature being attracted by said core when a current flows through said winding to energize said electromagnet means whereby said valve member is moved away from said seat; manually operated actuating means comprising a stem arranged to move said valve member away from said seat when said electromagnet means is de-energized; manually operated interrupter means comprising bearing means including a carrier portion outwardly adjacent to and supported by said end wall and a bearing portion rigid with said carrier portion, an interrupter lever pivotably mounted on said bearing portion, said lever having a first arm extending between said valve member and said carrier portion and a second arm, and a motion transmitting rod reciprocably mounted in said casing in parallelism with said stem and arranged to be moved by hand to engage said second arm whereby said lever pivots with respect to said bearing portion and its first arm moves the valve member into sealing engagement with said seat against the action of said armature when said electromagnet means is energized; and resilient means disposed between said carrier portion and said valve member, said resilient means being arranged to bias said valve member into sealing engagement with said seat and to simultaneously bias said carrier portion against the end wall of said housing.

3. A safety valve for gas burning apparatus, comprising a casing having gas-admitting inlet means, outlet means, and a seat provided between said inlet means and said outlet means; a valve member arranged to reciprocate into and out of sealing engagement with said seat to respectively terminate and permit the flow of a gaseous fuel from said inlet means to said outlet means; electromagnet means arranged to normally maintain said valve member out of sealing engagement with said seat, said electromagnet means comprising a housing mounted in said casing and having an end wall adjacent to said valve member, a core provided in said housing, a winding surrounding said core, an armature provided in said housing and reciprocable toward and away from said end wall in operative relationship with movements of said valve member, and a rod extending through said end wall and connecting said armature with said valve member, said armature being attracted by said core when a current flows through said winding to energize said electromagnet means whereby said valve member is moved away from said seat; manually operated actuating means comprising a stem arranged to move said valve member away from said seat when said electromagnet means is de-energized; manually operated interrupter means comprising bearing means including a carrier portion in the shape of an annulus outwardly adjacent to and supported by said end wall and a bearing portion rigid with said carrier portion, an interrupter lever pivotably mounted on said bearing portion, said lever having a first arm extending between said valve member and said carrier portion and a second arm, and a motion transmitting rod reciprocably mounted in said casing in parallelism with said stem and arranged to be moved by hand to engage said second arm whereby said lever pivots with respect to said bearing portion and its first arm moves the valve member into sealing engagement with said seat against the action of said armature when said electromagnet means is energized; and resilient means for biasing said carrier portion against said end wall.

4. A safety valve for gas burning apparatus, comprising a casing having gas-admitting inlet means, outlet means, and a seat provided between said inlet means and said outlet means; a valve member arranged to reciprocate into and out of sealing engagement with said seat to respectively terminate and permit the flow of a gaseous fuel from said inlet means to said outlet means; electromagnet means arranged to normally maintain said valve member out of sealing engagement with said seat, said electromagnet means comprising a housing mounted in said casing and having an end wall adjacent to said valve member, a core provided in said housing, a winding surrounding said core, an armature provided in said housing and reciprocable toward and away from said end wall in operative relationship with movements of said valve member, and a rod extending through said end wall and connecting said armature with said valve member, said armature being attracted by said core when a current flows through said winding to energize said electromagnet means whereby said valve member is moved away from said seat; manually operated actuating means comprising a stem arranged to move said valve member away from said seat when said electromagnet means is deenergized; and manually operated interrupter means comprising bearing means including a carrier portion outwardly adjacent to and supported by said end wall and a bearing portion rigid with said carrier portion, an interrupter lever pivotably mounted on said bearing portion, said lever having a first arm extending between said valve member and said carrier portion and a second arm, and a motion transmitting rod reciprocably mounted in said casing in parallelism with said stem and arranged to be moved by hand to engage said second arm whereby said lever pivots with respect to said bearing portion and its first arm moves the valve member into sealing engagement with said seat against the action of said armature when said electromagnet means is energized, said bearing means being arranged to arrest said lever in an end position in which said first arm has moved said valve member into sealing engagement with said seat.

References Cited by the Examiner
UNITED STATES PATENTS

| | | | |
|---|---|---|---|
| 2,155,358 | 4/1939 | Cyr | 251—130 X |
| 2,389,387 | 11/1945 | Rutherford et al. | 251—130 X |
| 2,549,188 | 4/1951 | Forsnas | 251—130 X |
| 2,862,684 | 12/1958 | Ander | 251—130 |
| 2,901,034 | 8/1959 | Puttfarcken et al. | 158—131 |
| 2,917,239 | 12/1959 | Mathews | 236—1 |
| 2,932,978 | 4/1960 | Newbery | 251—130 |
| 2,974,869 | 3/1961 | Hajny | 236—1 |

FREDERICK L. MATTESON, JR., *Primary Examiner.*

ROBERT A. O'LEARY, *Examiner.*

J. W. WESTHAVER, *Assistant Examiner.*